United States Patent [19]

Nakayama

[11] Patent Number: 4,561,078
[45] Date of Patent: Dec. 24, 1985

[54] DISC CHANGER AND DISC HOLDER AND BOX FOR USE WITH SUCH A CHANGER

[75] Inventor: Mitsuhisa Nakayama, Kanagawa, Japan

[73] Assignee: U.S. Philips Corporation, New York, N.Y.

[21] Appl. No.: 517,174

[22] Filed: Jul. 25, 1983

[30] Foreign Application Priority Data

| Aug. 11, 1982 | [JP] | Japan | 57-140061 |
| Aug. 18, 1982 | [JP] | Japan | 57-143638 |
| Aug. 19, 1982 | [JP] | Japan | 57-144391 |
| Aug. 20, 1982 | [JP] | Japan | 57-145166 |
| Aug. 23, 1982 | [JP] | Japan | 57-146671 |

[51] Int. Cl.⁴ .................. G11B 17/00; G11B 5/48
[52] U.S. Cl. .......................... 369/38; 369/36
[58] Field of Search ............... 369/36, 38, 39

[56] References Cited

U.S. PATENT DOCUMENTS

| 2,725,235 | 11/1955 | Hull et al. | 369/39 |
| 2,891,797 | 6/1959 | Hull et al. | 369/38 |
| 3,662,344 | 5/1972 | Menke | 369/39 |
| 4,286,790 | 9/1981 | Siryj et al. | 369/36 |

OTHER PUBLICATIONS

*Megadoc, a Modular System etc.*, J. A. de Vos, Phillips Technical Review, vol. 39, 1980, #12, pp. 329-342.

*Primary Examiner*—Steven L. Stephan
*Attorney, Agent, or Firm*—Robert S. Smith

[57] ABSTRACT

A disc changer is provided with a player deck with a turntable and a light pen and a loading device. The loading device comprises a platform which is movable up and down relative to the turntable, a box with a plurality of disc holders, horizontally slidable into and out of the platform and provided with a hole. The hole in each holder is formed so that the holder can pass the turntable and the light pen unimpededly. The loading device further comprises a transport mechanism engaging the respective holders alongside the platform for moving the respective holders from the box to the platform and a lift mechanism with a lift compartment for the box to move the box to a specific height position. The loading device co-operates with a loading lever with a disc loader for urging a disc on the turntable.

15 Claims, 8 Drawing Figures

DISC CHANGER AND DISC HOLDER AND BOX FOR USE WITH SUCH A CHANGER

The invention relates to a disc changer comprising a player deck, provided with a turntable which is mounted for rotation in a chassis and a loading devide for transferring a disc from and towards the turntable, which loading device comprises:

a platform which can be moved up and down relative to the turntable, a plurality of disc holders which can each be slid into and out of the platform and which each have a circular recess, which is open at the top, for receiving a disc and a hole in the bottom of the recess, which can be moved to a position below the top of the turntable by means of the platform to place the disc onto the turntable in a position in which it is clear of the holder, a box with a plurality of holder compartments which can each receive a disc holder, a transport mechanism for moving the respective disc holders in a substantially horizontal direction in the upper position of the platform, a lift mechanism comprising a lift compartment for the box, said compartment with the box being movable up and down into a specific height position, to move a disc holder thus selected between the holder compartment and the platform by means of the transport mechanism.

Disc changers of this type are well known. An example of such a disc changer is described in French Patent Specification No. 529,368. Such a disc changer is suitable for playing and changing conventional audio discs which are scanned mechanically by means of a stylus. Such discs have a comparatively large diameter, so that the known changer requires the use of a comparatively large playing mechanism and a bulky box for the disc holders. As a result of this, such a known disc changer is not suitable for normal home-entertainment purposes and is employed only for professional or semi-professional uses.

Recently developed disc players, for example the Philips type CD 100, comprise a playing mechanism which optically reads a disc by means of an optical head or a light pen equipped with a laser. Such discs, known as "Compact Discs" combine a long playing time with a small diameter, enabling the use of a playing mechanism of compact construction. During playing the discs must be positioned accurately on the turntable and for this reason they are urged onto the turntable by means of a disc loader arranged above the turntable.

The use of such an optical player in the abovementioned disc changer gives rise to problems because of the construction of the loading device of this known changer. For example, in the known changer the transport mechanism is arranged directly above the platform, so that it is not possible to arrange a disc loader at this location. The opening in the disc holder for the passage of the turntable is dimensioned so that the light pen in the optical player would obstruct the passage of such a disc holder.

The invention aims at constructing a disc changer of the type mentioned in the opening paragraph so that it is capable of playing and changing optically readable audio discs.

To this end the invention is characterized in that the player deck (12) further comprises a light pen which is arranged adjacent the turntable and which is movable relative to said turntable, for playing optically readable audio discs (CD), the hole in each holder is formed so that the holder as it moves to a position below the top of the turntable can pass the light pen unimpededly, the loading device cooperates with a loading lever provided with a disc loader for urging a disc into the correct position on the turntable, the transport mechanism engages with the respective holders during the movement alongside the platform.

This results in a disc changer of limited external dimensions which is capable of playing and changing many discs in succession. Owing to this, the disc changer is very suitable for home-entertainment use or for use in mobile equipment, for example in a car. The limited size of the discs also enables a compact storage system to be obtained using the boxes employed for the changer.

A preferred embodiment of the invention is characterized in that the loading lever is pivotable about a spindle which is situated adjacent the platform, is coupled to the platform at least during a part of its movement and is moved away from and towards the turntable via this coupling, while the platform positions the loading lever in the upper position. This results in a correct co-ordination of the movements of the platform and the loading lever, ensuring that in the upper position of the platform the disc loader is situated at such a distance above the disc to allow an unimpeded displacement of the disc holder.

In this respect another preferred embodiment of the invention is characterized in that the loading lever comprises two parts which enclose an obtuse angle, of which a first part which adjoins the pivotal spindle is urged against a wall of the platen by a spring and slides along this wall during the pivotal movement, a second part carrying the disc loader. The sliding movement of the first part of the loading lever along a wall of the platform results in an optimum co-ordination of the movements of the loading lever and the platform, using a simple construction comprising few components.

A further preferred embodiment of the invention is characterized in that the platform has substantially horizontal grooves in facing first and second side walls, for guiding the sliding movement and for positioning the disc holder, and has a slot in a third side wall which adjoins the lift compartment for the passage of the holder, a hole being formed in at least one of the facing side walls for the co-operation of the transport mechanism with the disc holder. This results in a smooth sliding movement of the disc holder in the platform, the opening in the side wall enabling the disc holder to be slid into the platform by means of the transport mechanism via said side wall.

Another preferred embodiment of the invention is characterized in that the box has an opening in an upright side wall, which opening extends across the box compartments in the vertical direction, and the lift compartment also has an opening in a upright side wall adjacent said opening in the box, a first drive wheel being disposed in the two openings and a second drive wheel extending through the hole in the side wall of the platform for moving the disc holder. Thus, the transport mechanism can effectively transfer the disc holder from one end position to the other end position owing to the contact of the drive wheels with the box through the openings in the platform and in the lift compartment.

A smooth insertion and removal of the box into and from the lift compartment is obtained in yet another preferred embodiment of the invention is characterized in that the lift compartment has openings in two adjoining upright sides, of which a first opening is intended for sliding the box into and out of the compartment and a second opening is intended for sliding the disc holder into and out of the box.

A disc holder for use in the disc changer in accordance with the invention is characterized in that the hole in the bottom of the recess has a central part for the passage of the turntable and an adjacent outward part for the passage of the light pen. This ensures that the up and down movement of the disc holder is not obstructed by the turntable and the light pen adjacent the turntable. These steps render the disc holder in accordance with the invention suitable for universal use in an optical playing apparatus.

Another disc holder, which comprises two facing edge portions which extent parallel to each other, is characterized in that the first edge portion has a smaller height than a second edge portion. In this way a disc holder can be inserted into the box and the platform in only one position of the disc holder, which ensures that the disc holder is in the correct position when it is located above the turntable.

A box for use in conjunction with the disc changer in accordance with the invention is characterized in that the box has horizontal grooves in two facing upright side walls, each pair of said grooves forming a holder compartment for receiving a disc holder. This yields a box which in spite of its simple construction ensures a correct guidance and positioning of the disc holders.

In this respect a box into which the disc holders can be inserted in one position only is characterized in that the grooves in one side wall have a smaller height than the grooves in the other side wall.

An embodiment of the invention will now be described with reference to the accompanying drawing. In the drawing.

Figure 1:
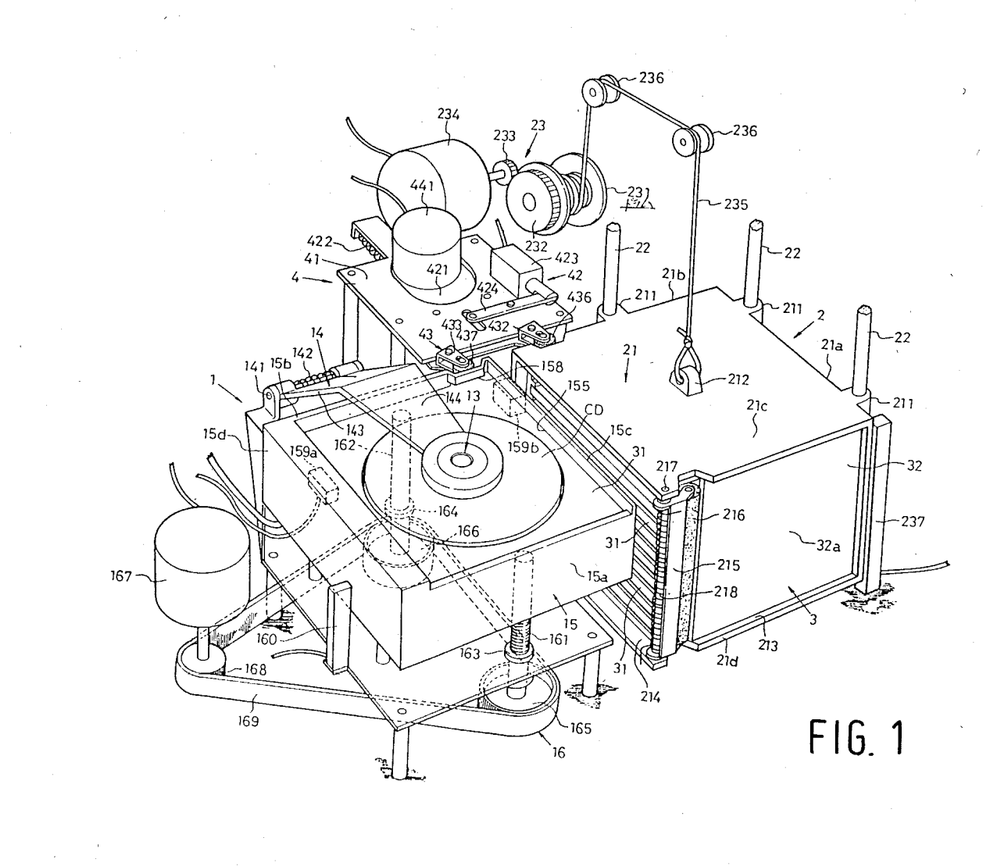
FIG. 1 is an oblique view that shows the whole of the mechanical construction of the player.
Figure 3:
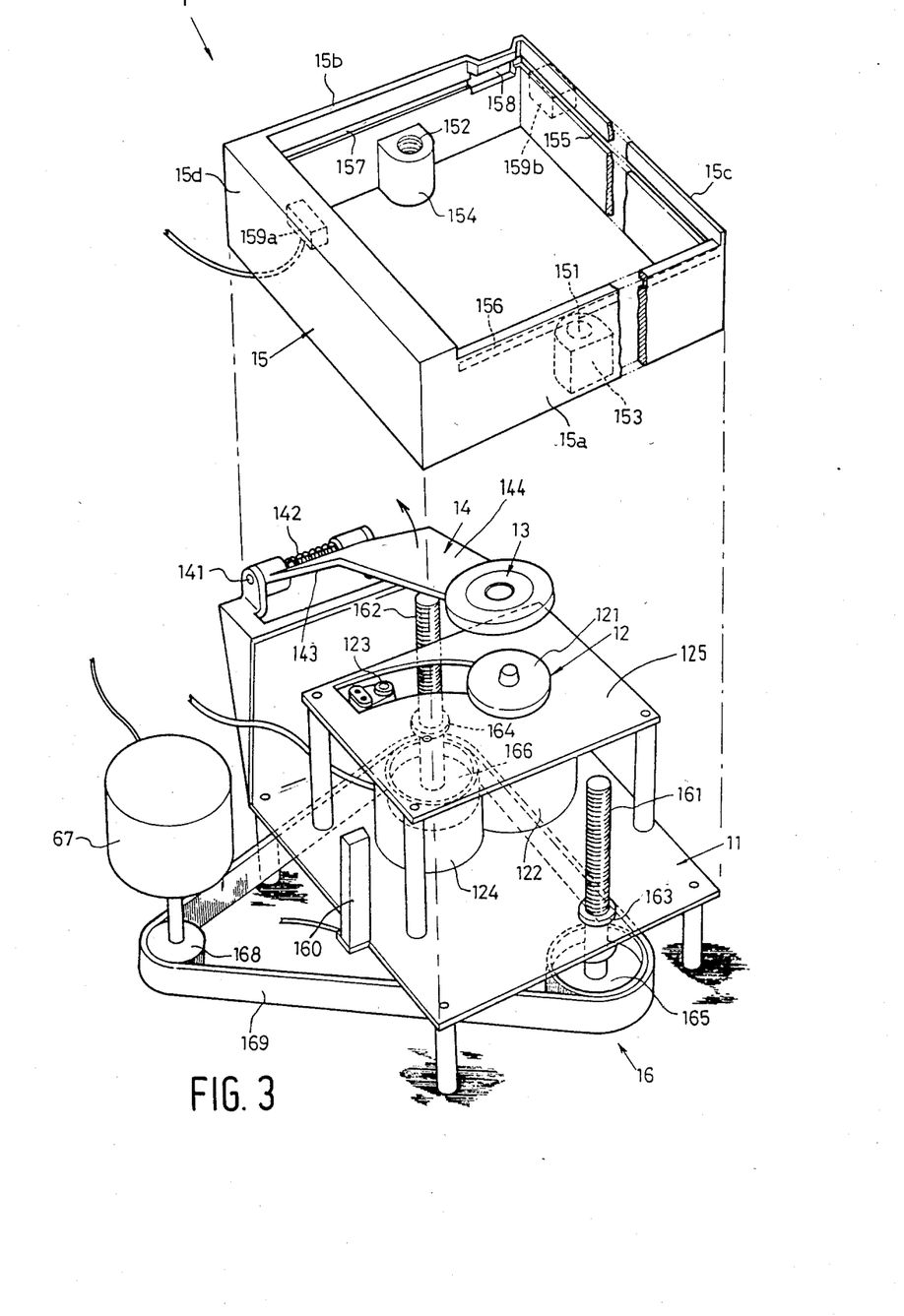
FIGS. 3 and 4 are exploded oblique drawings of essential parts of the player.

As shown in FIG. 1, a player body 1 of a disc changer comprises a player deck 12, a lift mechanism formed by an elevator 2 adjoins the right hand side of the said player body 1. A disc box 3 is provided so that it can be freely attached to and removed from the said elevator 2, inside which are housed a plurality of disc holders 31, so that they can be slipped in and out freely by a loading device comprising a transport mechanism 4. This transport mechanism adjoins the back of the player body 1 and the elevator 2 and supplies the selected one of the above mentioned disc holders 31 that is located at the prescribed height to the player body. As shown in FIG. 3, the player body 1 is furnished with the player deck 12 on the top of a chassis 11 and a disc loader formed by a pressure ring 13 is arranged above the said player deck and the said pressure ring is supported to rotate freely on a loading lever 14 that is pivotal connected by a pivot 141 to the back part of the chassis 11. Furthermore a square raising and lowering platform 15 is arranged to surround the player deck and the platform 15 is raised and lowered by a lifter 16 that is provided in the bottom part of the chassis 11.

The player deck 12 comprises a small turntable 121 which is rotatably supported in a subchassis 125 and on which the disc is placed, a motor 122 that rotates the turntable 121, a light pen 123 that is located at the side of the turntable 121 and which reads out optically the concavities and convexities of a disc and a linear motor 124 that tracks the said light pen. The player deck enables to read out small discs with a diameter of 12 cm known as "Compact Discs", carrying digital audio information at only one side. Since the amount of information on a disc (in the drawing indicated with "CD") is large, the disc enables a long playing time to be obtained. The pressure ring 13 is formed with a permanent magnet so that it is attracted to the turntable 121. The lever 14 comprises two parts 143 and 144, enclosing an obtuse angle and a spring 142 is wind around the pivot 141 pressing the lever 14 downwards.

The platform 15 has at two location bosses 153 and 154 which have threaded holes 151 and 152 established on a front wall 15a and a back wall 15b and an elongated disc holder feed in slot 155 is established in the upper part of a right hand wall 15c on the elevator side. A pair of elongated disc holder guide grooves 156, 157 are established on the fron wall 15a and the back wall 15b, linking with the said feed in slot and a disc holder 31 can be fed in along these grooves. A window hole 158 which opens up part of the guide groove 157 is penetrated through the right end part of the rear wall 15b and a fed-in detector 159a for the disc holder 31 is established on the inner surface of the left side wall 15d and a fed-out detector 159b for the disc holder 31 is established on the outer surface of the right side wall 15c. Moreover the said fed out detector may be established on the side of the elevator 2.

The lifter 16 has a pair of screw rods 161, 162 that are arranged standing upwards at suitable places on the chassis 11 and bearings 163, 164 are established at the bottoms of these screw rods, and the screw rods are screwed into the bosses 153, 154 respectively of the raising and lowering platform 15. Pulleys 165, 166 are fixed to the lower ends of the screw rods and a reversible motor 167 for drive purposes is arranged in a suitable place and a motor pulley 168 is fixed to the rotating shaft of the said reversible motor. A belt 169 is fitted to the said motor pulley and the pulleys 165, 166 of the screw rods and the screw rods 161, 162 are rotated by the forward and reverse rotation of the reversible motor 167 via the pulleys 168, 165, 166 and the belt 169 and in this way the raising and lowering platform 15 is raised and lowered. Moreover, a position detector 160 which detects the raised and lowered position of the raising and lowering platform 15 is fitted at a suitable place on the chassis 11. Moreover, the above mentioned belt 169 may be a timing belt.

Figure 4:
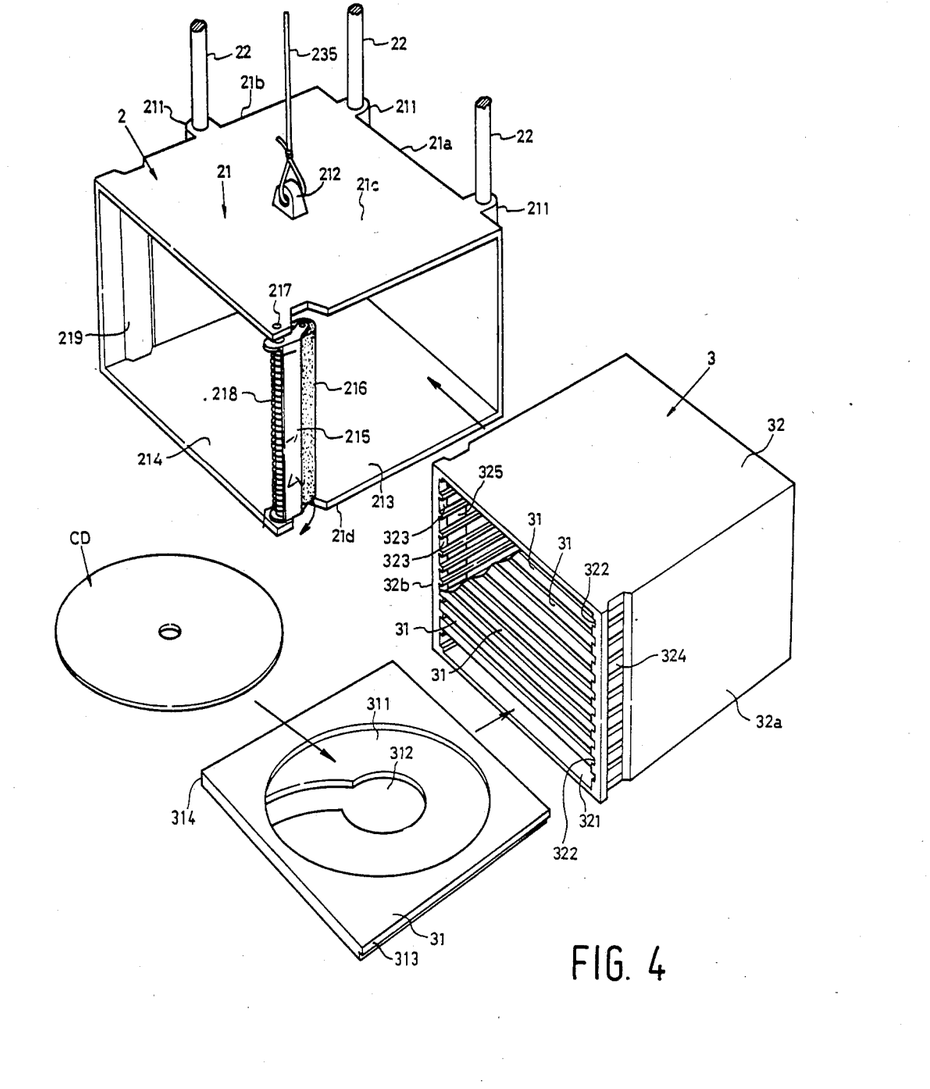

The elevator 2, as shown in FIG. 4 comprises a lift compartment 21 which is guided in the up-down direction by a plurality of vertically orientated guide rails 22 and the said compartment can be raised and lowered with a winder 23 (see FIG. 1).

The compartment 21 has a plurality of bosses 211, established on the right side wall 21a and the back wall 21b, these bosses are engaged on the guide rails 22 so that they can slide freely. A suspending ring 212 is established in the centre of a top wall 21c. The front face and the left side, which is the player body side, are formed as openings 213 and 214 and a long vertical roller 216, that is supported on a wide and short arm 215, is arranged in the left corner of the front face. This arm 215 is pivoted at 217 to the top wall 21c and a bottom wall 21d. A spring 218 is fixed on the said arm and this depends on the roller 216 towards the rear. A long vertical opening 219 is penetrated through the rear wall 21b near the left hand edge.

The winder 23 has a reversible motor 234 that is linked to a drum 231 via speed reducing gears 232, 233 and a cord 235 that is wound up on the drum 231 is connected to the suspending ring 212 of the compartment 21 via a plurality of fixed pulleys 236 for direction changing purposes and by the forward or reverse running of the reversible motor 234 the drum 231 is rotated forward or in reverse via the speed reducing gears 232, 233 and the compartment 21 is raised and lowered via the cord 235. Furthermore, a position detector 237 which detects the raised or lowered position of the compartment 21, is established in a suitable place.

The disc box 3, as shown in FIG. 4, is in the form of a box 32 which has the left side surface in the form of an opening 321, which box is inserted so that it can be removed into the above mentioned compartment 21 via the open front part 213 of the compartment. At the time of insertion and removal, the roller 216 at the front surface of the compartment is rotated to the left against the spring 218. A plurality of horizontal grooves 322, 323 are arranged in parallel and facing opposite to each other on the inner surfaces of a front wall 32a and a back wall 32b and the plurality of disc holders 31 are housed in these horizontal grooves so that they can be slipped in and out and inserted freely. Each pair of grooves 322, 323 form a holder compartment for receiving a disc holder 31. Furthermore, long vertically extending openings 324, 325 are penetrated through the front wall 32a and the rear wall 32b near the left edges and the roller 216 of the front surface of the lift compartment 21 is inserted into the opening 324 on the front surface and makes a press contact on the disc holder 31. Moreover, the horizontal grooves 322 on the front wall side have a smaller height than the horizontal grooves 323 on the back wall side and the disc holders 31 are made accordingly with side walls 313 and 314 respectively and the orientation of the disc receiving plates is thus ensured.

The disc holders 31 have a large circular shaped concavity 311 formed in the upper surfaces so that the compact disc (CD) can be housed in the concavity and a window hole 312 is penetrated from the center of the said concavity to the edge of the said concavity for the insertion of the turntable 121 of the above mentioned player deck 12 through a central part of said hole 312 and movement of the optical head a light pen 123 through an outwardly extending part of said hole 312. It is remarked that another configuration of the hole 312 is possible; important is that the dimension of the hole 312 is such that both the turntable 121 and the light pen 123 don't obstruct the passage of the holder 31.

Figure 5:
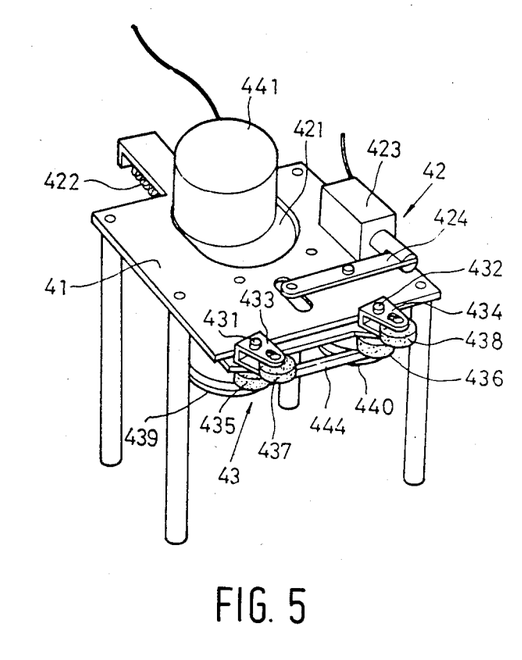
FIG. 5 is an oblique view of other essential parts of the player.
Figure 6:
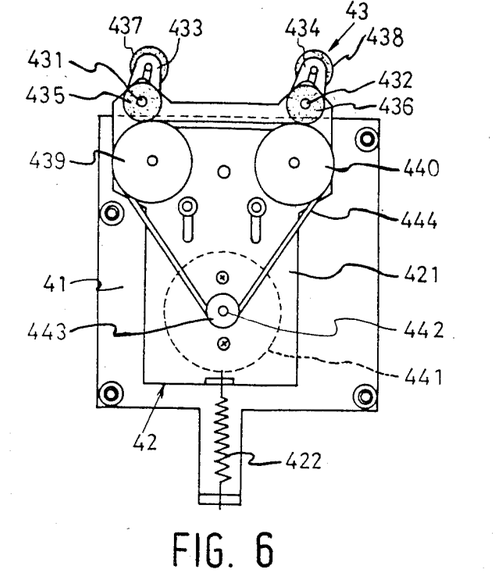
FIG. 6 is a base view of the same essential parts of the playter.

The transport mechanism 4, as shown in FIGS. 5 and 6, consists of feed out equipment 42 and drive equipment 43 which is furnished by the said feed out equipment. The drive equipment 43 is advanced to the active position by the feed out equipment 42, the one of the disc holders 31 in the dic box 3 that is located at the prescribed height is sent into the player body 1 by the said drive equipment. The transport mechanism 4 can also return one of the disc holders.

The feed out equipment 42 has established an operating plate 421 which slides in a direction perpendicular to the sliding direction of the holders 31 on a chassis 41 and the said operating plate is held to the rear by a spring 422 which is slung between the plate and the chassis and furthermore the operating plate can be moved against this spring 422 via a lever 424 by means of a solenoid 423 that is fitted to the chassis.

Figure 7:
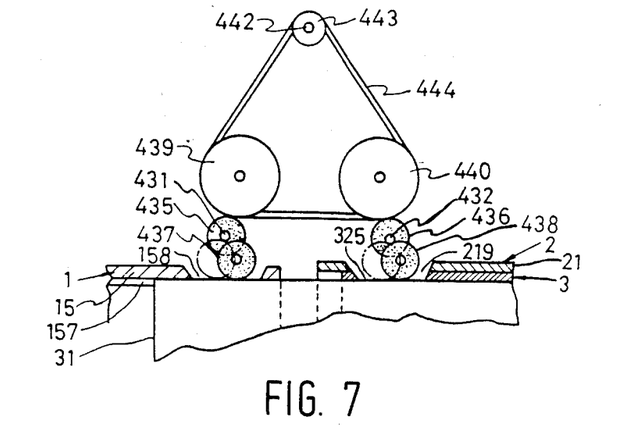
FIG. 7 is an operating explanatory drawing of the same essential parts of the player.

Drive equipment 43 is provided on the front edge of the above mentioned operating plate with two small rotating vertical shafts 431, 432 which correspond with the hole 158 in the rear wall 15b of the platform 15 in the player body 1 (FIG. 3) and the opening 219 in the rear wall 21b of the lift compartment 21 in the elevator 2 and these have bearings at the midway points respectively and, on the said rotating vertical shafts are fitted at the tops respectively small arms 433, 434 which can be rotated by friction and at the bottom ends of the vertical shafts are fixed idlers 435, 436. Drive wheels or rollers 437, 438 are provided on the small arms 433, 434 to rotate freely and to freely contact with and separate from the rotating vertical shafts. Furthermore, two pulleys 439, 440, which are in contact with the idlers 435, 436, are mounted to rotate freely on the front part of the operating plate 421, a reversible motor 441 is fixed to the back part of the operating plate 421, a motor pulley 443 is fixed to the rotating shaft 442 of the said reversible motor, a belt 444 is suspended between the said motor pulley and the two pulleys 439 and 440 noted above and, by the forward and reverse rotation of the reversible motor 441 the same direction of forward and reverse rotation is imparted to the two rotating vertical shafts 431, 432 via the pulleys 443, 439, 440 and the belt 444 and friction rotation is produced in the small arms 433, 434 by this said rotation. As a result of this, as shown in FIG. 7, the two drive rollers 437, 438 are brought into contact with the edge part of the disc holder 31 via the holes or openings 158, 219, 325 and also they make contact with the rotating vertical shafts 431, 432 by means of the reaction force of the said contact and the forward or reverse rotation of the said rotating vertical shafts is transferred to the edge part of the disc holder 31 via the drive rollers and the said disc holder is fed in or returned.

Figure 8:
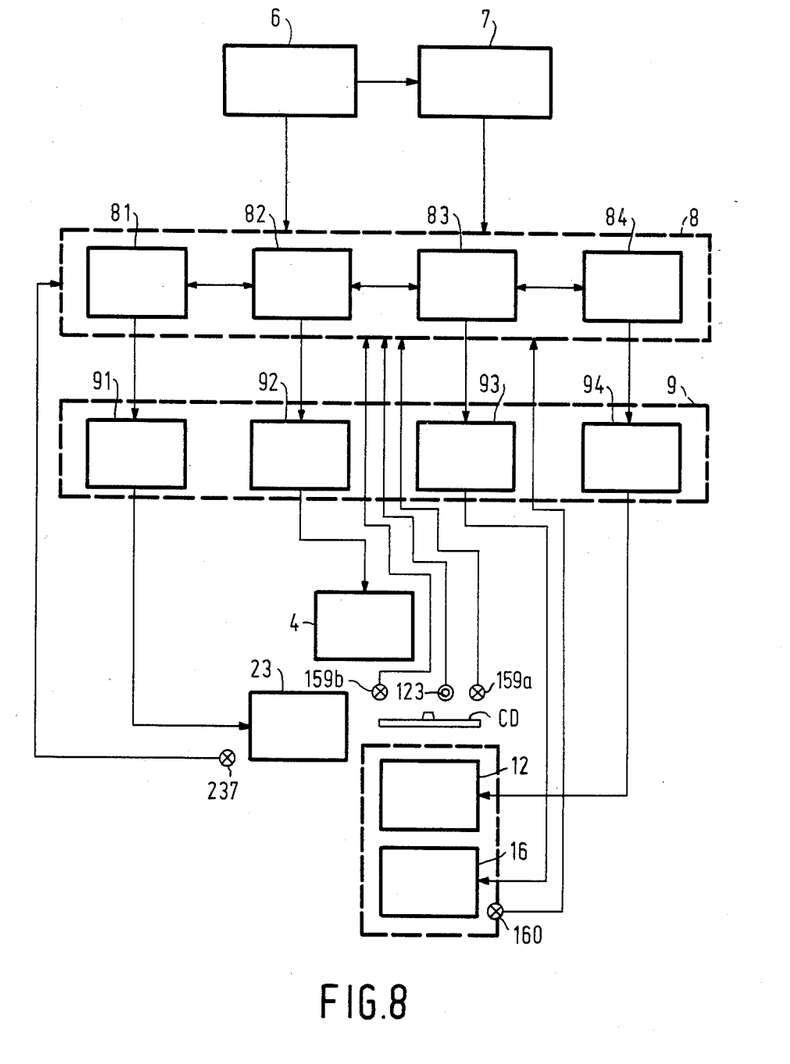
FIG. 8 is a block diagram of the electrical circuits.

Next, the electrical circuit for the mechanical construction outlined above is shown in FIG. 8. The audio circuits have been omitted.

This electrical circuit has an operating part 6 that produces various command signals and call out signals for the required disc (CD) by means of hand operation, a memory 7 which stores the call out signals from the said operating part in the correct order and, on the basis of command signals from the operating part 6, this sends out appropriately the call out signals that have been stored, a control circuit 8 which receives the call out signals and command signals from the operating part 6 and the memory 7 and the detection signals from the various detectors mentioned above and which operates and produces the required control signals, and the driver 9 which receives the control signals from the said control circuit and operates each of the mechanisms that have been described above.

The operating part 6 is furnished with various keys such as ten disc selection keys, a memory key, a clear key, a start key, a back key, a stop key etc and an electrical source switch and by operating these keys the call out signals for the required compact discs CD and the various command signals are put out.

The memory 7 is a solid state memory and on the basis of various command signals from the operating part 6, the plurality of call out signals from the operating part are stored in the correct order, put out and erased.

The control circuit 8 has a winder control circuit 81, a transport control circuit 82, a lifter control circuit 83 and a player deck control circuit 84 and these are linked together and the control circuit receives the command signals and the call out signals from the operating part 6 and the memory 7 and carries out the operations in order of ranking. First of all, the compact disc CD that has been set should be fed out so firstly the lifter control circuit 83 and secondly the transport control circuit 82 operate. Then the required compact disc CD should be fed in so thirdly the winder control circuit 81, fourthly the transport control circuit 82, fifthly the lifter control circuit 83 and sixthly a player deck control circuit 84 operate. However, when no compact disc has been set earlier, this is detected by the optical head or light pen 123 of the player deck and the second stage, namely the transport control circuit 82 operation, is omitted.

Furthermore, the control circuit 8 has feed back control with the detection signals from the light pen 123 of the player deck 12, the disc holder 31 fed in detector 159a of the raising and lowering platform 15, the fed out detector 159b of the platform 15 and the position detector 160 of the platform 15 in the player body 1 and also from the location detector 237 of the raising and lowering compartment 21 in the elevator 2, in accordance with the operation of the various mechanisms and hence the operation of each mechanism is correctly controlled.

The driver 9 consists of a winder driver 91, a transport driver 92, a lifter driver 93 and a player deck driver 94. The winder driver 91 rotates the reversible motor 234 of the winder 23 either forwards or in reverse according to the control signals from the winder control circuit 81, the transport driver 92 operates the solenoid 423 of the transport mechanism 4 and rotates the reversible motor 441 either forwards or in reverse according to the control signals from the transport control circuit 82, the lifter driver 93 rotates the reversible motor 167 of the lifter 16 either forwards or in reverse according to the control signals from the lifter control circuit 83 and the player deck driver 94 rotates the motor 122 and operates the linear motor 124 of the player deck 12 forwards or in reverse according to the control signals from the player deck control circuit 84.

The construction is as noted above and for use, discs CD are housed respectively in each of the disc holders 31 of the disc box 3 and the said disc box 3 is inserted into the raising and lowering compartment 21 of the elevator 2. The operating part 6 is operated manually, the required disc CD from the discs is called out and this is automatically set in the player body 1. This operation is explained with reference to FIG. 2.

Figure 2:
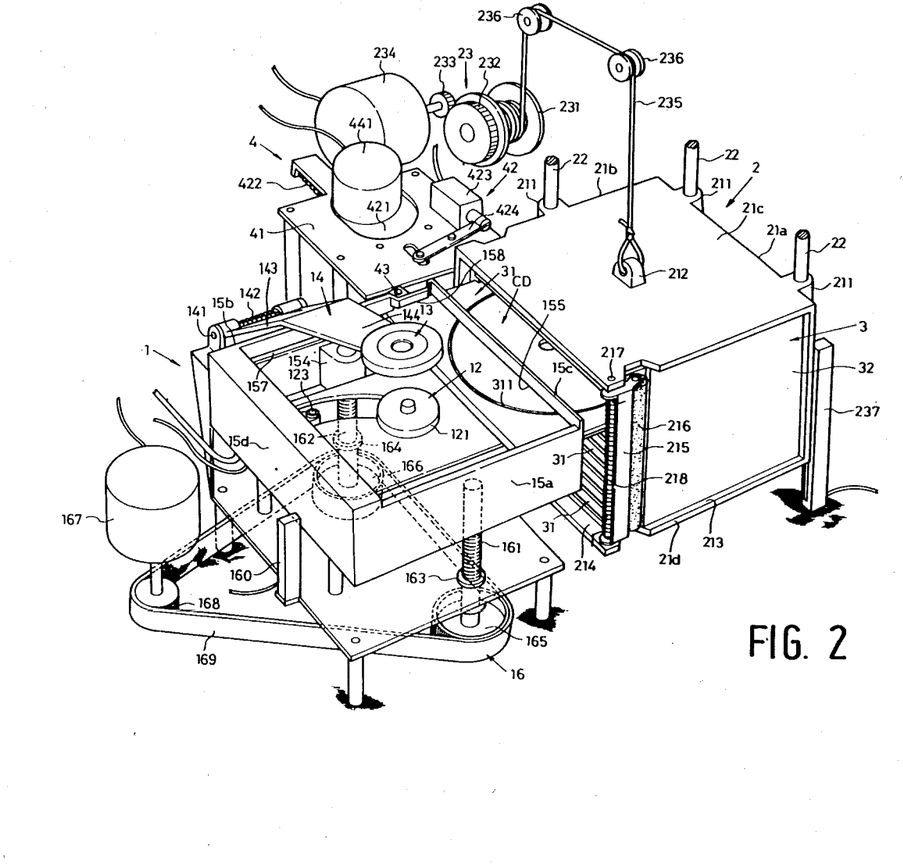
FIG. 2 is an oblique view of the construction of FIG. 1 showing the operating state.

When the start command signal and the required disc CD call out signal are put out from the operating part 6 and the memory 7 by the operation of the operating part, first of all the player body 1 is positively operated. When the above mentioned command signal and call out signal are put out the lifter control circuit 83 operates in the control circuit 8 and the said lifter control circuit controls the lifter driver 91, the reversible motor 167 of the lifter 16 is rotated forwards, the platform 15 is raised, the disc CD that was on the turntable 121 of the player deck 12 is transferred into the disc holder 31 and the part 143 of the lever 14 of the pressure ring 13 is pushed upwards by the back wall 156 against the spring 142. Then, when the platform 15 has been raised to the prescribed height, the position detector 160 puts out a raised point detected signal and this is fed back to the lifter control circuit, the reversible motor 167 is stopped and the platform 15 is stopped at this position, positioning with its back wall 156 the lever 14 with the pressure ring 13 at a higher level above the disc CD holder 31 and the disc.

Furthermore, initially, the presence or absence of a disc is detected by the light pen 123 of the player deck 12 and there is pre feed back control to the transport control circuit 82 in accordance with this and if a disc CD is present, after the raising of the above mentioned platform 15 the transport mechanism 4 is operated in reverse and if there is no disc present this reverse operation of the mechanism 4 is omitted.

In this way, when there is already a disc CD in the player body 1, secondly, the transport mechanism 4 is operated in reverse and at this time the transport control circuit 82 operates on the basis of the raised point detected signal of the above mentioned position detector 160 of the player body and the said transport control circuit controls the transport driver 92, the solenoid 423 of the transport mechanism 4 is operated, the feed out equipment 42 operates, and at the same time the reversible motor 441 is rotated in reverse, the drive equipment 43 is operated in reverse, the drive rollers 437, 438 of the said drive equipment make contact with the edge part of the disc holder 31 and the disc holder 31 on which the disc is loaded is fed out from the player body and returned into the disc box 3. Then, the completion of the return is detected by the fed out detector 159b in the player body the said detected signal is fed back to the transport control circuit 82 and the reverse operation of the transport mechanism 4 is stopped.

When the transport mechanism 4 is stopped, thirdly, the elevator 2 is operated. The detection signal of the above mentioned fed out detector 159b at the same time operates the winder control circuit 81. However, in the case where there is no disc in the player body 1 and there is no reverse operation of the mechanism 4, the winder control circuit 81 is operated on the basis of the raised point detected signal of the position detector 160 which is used to detect the raising and lowering of the platform 15 in the player body. So, the said winder control circuit controls the winder driver 91 in accordance with the aforementioned call out signal, the reversible motor 234 of the winder is rotated either forwards or in reverse and as a result of this the raising and lowering compartment 21 is raised or lowered, the position detector 237 detects when the prescribed call out position has been reached and the said detected signal is fed back to the winder control circuit 81, the reversible motor 234 is stopped and the compartment is stopped at that position.

When the compartment 21 stops, fourthly, the transport mechanism 4 operates forwards. The detection signal of the above mentioned position detector 237 of the elevator 2 operates the transport control circuit 82 at the same time and the said transport control circuit controls the transport driver 92, the solenoid 423 of the mechanism 4 is operated, the feed out equipment 42 operates and the reversible motor 441 is rotated forwards, the drive equipment 43 is operated forwards, the drive rollers 437, 438 of the said drive equipment make contact with the edge part of the disc holder 31 that is located at the prescribed height and the said disc holder 31 on which the required disc CD that has been called out is loaded is fed into the inside of the platform 15 of the player body from the disc box 3. Then, the completion of this feeding in is detected by the fed in detector 159a that is in the player body 1 and the said detected signal is fed back to the transport control circuit 82 and the forward operation of the transport mechanism 4 is stopped.

When the mechanism 4 is stopped, fifthly, the player body operates in reverse. The detection signal of the above mentioned fed in detector 159a of the player body operates the lifter control circuit 83 at the same time and the said lifter control circuit controls the lifter driver 93, the reversible motor 167 of the lifter 16 is rotated in reverse and the platform 15 descends. As this is done, the required disc CD that is on the disc holder 31 is transferred onto the turntable 121 of the player deck 12. Then, the disc holder 31 descends to below the turntable 121 and the optical head or light pen 123 and as a result of the turntable passing upwards through the window hole 312 in the disc holder, the compact disc is transferred to and maintained on the turntable. Furthermore, as the platform 15 descends, the lever 14 of the pressure ring 13 that has been pushed up by the back-wall 156 of the raising and lowering frame also descends under the tension of the spring 142 and the pressure ring 13 is attracted onto the turntable 121 by magnetic force and the disc is pressed onto the turntable and held securely. Then, when the platform has descended enough, the position detector 160 puts out a descended point detected signal and the said descended point detected signal is fed back to the lifter control circuit 83 and the descent is stopped.

When the descent of the platform 15 stops, sixthly, the player deck 12 is operated and reproduction is started. The descended point detected signal of the above mentioned position detector 160 in the lifter 16 operates the player deck control circuit 84 at the same time and the said control circuit controls the player deck driver 94, the motor 122 of the player deck is rotated, the turntable is rotated and the required disc CD that has been set is rotated. Furthermore, the linear motor 124 of the player deck is operated forwards or in reverse and the light pen 123 is tracked. The said light pen then reads out the convexities and concavities (information) of the optical disc and this is sent to the audio line. When the light pen 123 has completed the required read out, a completion detected signal is sent to the control circuit 84, there is feed back control by the said control circuit and the operation of the player deck 12 is stopped. During this time the control circuit 84 also controls the player deck 12 in accordance with the command signals for stop, restart, back etc from the operating part 6.

As required, a disc box 3 in which is housed a plurality of discs CD can be inserted into the elevator and the required compact disc CD can be set in the player body 1 automatically simply by operating the operating part 6 and the disc can be played automatically.

Moreover, the above mentioned example of a disc changer is not limiting and of course various modifications are possible. For example, it may be such that the raising and lowering devices for the raising and lowering compartment 21 of the elevator 2 and the raising and lowering platform 15 for the player body 1 may involve the use of rubber, guide plate or rack and pinion systems instead of using cord or screws, or the drive rollers 436, 437 of the transport mechanism 4 can be replaced by pinions.

According to this invention, by attaching the disc box in which a plurality of discs are housed, it is possible to select and set the discs in the said box automatically and it is possible to provide a small type disc changer for which there is a strong market demand. This is particularly effective for domestic use, giving also the possibility to store the discs in the disc box, when not in use. It is also very effective for use in vehicles, for use in ships and for use in aircraft etc, especially by using a remote control unit for operating the disc changer, which can be mounted at a distance, for example in the baggage compartment of a car.

What is claimed is:

1. A disc changer comprising a player deck, provided with a turntable which is mounted for rotation in a chassis and a loading device for transferring a disc to and from the turntable, which loading device comprises:

a platform mounted for selective movement up and down relative to the turntable, a plurality of disc holders, configured for selective sliding movement onto and off of the platform, each disc holder having a circular recess, which is open at the top for receiving a disc, each disc holder having a hole in the bottom of the recess, each disc holder being movable to a position where the disc holder is supported by the platform after the disc holder is moved to the platform, a box having a plurality of disc holder compartments, each compartment being dimensioned to receive a disc holder, a transport mechanism for moving the respective disc holders in a substantially horizontal direction to a predetermined position on the platform, a lift mechanism comprising a lift compartment for the box, said compartment and the box being movable up and down to one of a plurality of predetermined height positions, said transport mechanism moving a disc holder between the holder compartment and the platform, the lift compartment having first and second adjoining upright sides and a first opening in said first upright side, said first opening being dimensioned and configured for sliding the box into and out of the compartment, the player deck further comprising an optical head disposed adjacent the turntable and which is movable relative to the turntable, for playing optically readable information discs, the hole in each holder being formed so that the holder as it moves to a position below the top of the turntable can pass the optical head without impediment, the loading device including a loading lever provided with a disc loader for urging a disc into the correct position on the turntable, the transport mechanism including means for engagement with respective disc holders during the movement alongside the platform.

2. A disc changer as claimed in claim 1, wherein the loading lever is pivotable about a spindle which is situated adjacent the platform, is coupled to the platform at least during a part of its movement and is moved away from and towards the turntable via this coupling, while the platform positions the loading lever in the upper position.

3. A disc changer as claimed in claim 2, wherein the loading lever comprises two parts which enclose an obtuse angle, of which a first part which adjoins the pivotal spindle is urged against a wall of the plate by a spring and slides along this wall during the pivotal movement, a second part carrying the disc loader.

4. A disc changer as claimed in claims 1, 2, or 3, wherein the platform is mounted for movement up and down by means of a reversible motor and is coupled to the motor at two locations which are situated near facing side walls.

5. A disc changer as claimed in claims 1, 2 or 3, wherein the platform has substantially horizontal grooves in facing first and second side walls, for guiding the sliding movement and for positioning the disc holder, and has a slot in a third side wall which adjoins the lift compartment, for the passage of the holder, a hole being formed in at least one of the facing side wall for the cooperation of the transport mechanism with the disc holder.

6. A disc changer as claimed in claims 1, 2, or 3, characterized in that the transport mechanism comprises at least one drive wheel, which is arranged to be movable in a direction perpendicular to the sliding direction of the disc holder.

7. A disc changer as claimed in claim 6, characterized in that the transport mechanism comprises a first and second drive wheels which are coupled to each other and which can be driven by a reversible motor, said wheels being connected to a sub-frame by means of pivotal arms which sub-frame is movable in said direction perpendicular to the sliding direction of the disc holder.

8. A disc changer as claimed in claim 5, wherein the box has an opening in an upright side wall which opening extends across the box compartments in the vertical direction, and the lift compartment also has an opening in an upright side wall adjacent said opening in the box, a first drive wheel being disposed in the two openings and a second drive wheel extending through the hole in the side wall of the platform, for moving the disc holder.

9. A disc changer as claimed in claim 8, characterized in that the lift compartment has a second opening in a second of first and second adjoining upright sides, the second opening being intended for sliding the disc holder into and out of the box.

10. A disc changer as claimed in claim 9, wherein the lift compartment comprises a pivotally mounted roller which is rotatable about an upright axis, which is situated near the first opening, which extends into a further opening in the box, and which is urged against the disc holders in the box under the influence of a spring.

11. A disc holder for use in conjunction with a disc changer as claimed in claims 1, 2, or 3, wherein the hole in the bottom of the recess has a central part for the passage of the turntable and an adjacent outward part for the passage of the light pen.

12. A disc holder as claimed in claim 11, the disc holder comprising two edge portions which extend parallel to each other and which are situated on facing sides, the first edge portion having a smaller height than a second edge portion.

13. A box for use in conjunction with a disc changer as claimed in claims 1, 2, or 3, wherein the box has horizontal grooves in two facing upright side walls, each pair of said grooves forming a holder compartment for receiving a disc holder.

14. A box as claimed in claim 13, characterized in that the grooves in one side wall have a smaller height than the grooves in the other side wall.

15. A box as claimed in claim 13, characterized in that in two opposite side walls of the box openings are formed which extend in the direction of the height dimension of the box.

* * * * *